United States Patent
Harless

(10) Patent No.: US 6,313,811 B1
(45) Date of Patent: Nov. 6, 2001

(54) LIGHTWEIGHT, COMPACTLY DEPLOYABLE SUPPORT STRUCTURE

(75) Inventor: Richard I. Harless, West Melbourne, FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/330,959

(22) Filed: Jun. 11, 1999

(51) Int. Cl.[7] .................................................. H01Q 15/20
(52) U.S. Cl. ............................ 343/915; 343/912; 52/111
(58) Field of Search ................................. 343/915, 912, 343/880, 882, DIG. 2; 52/111; H01Q 15/20

(56) References Cited

U.S. PATENT DOCUMENTS

| | | | |
|---|---|---|---|
| 3,913,105 | 10/1975 | Williamson et al. | 343/840 |
| 3,978,490 | 8/1976 | Fletcher et al. | 343/882 |
| 4,030,102 | 6/1977 | Kaplan et al. | 343/915 |
| 4,030,103 | 6/1977 | Campbell | 343/915 |
| 4,271,822 | 6/1981 | Radebold | 126/426 |
| 4,315,265 | 2/1982 | Palmer et al. | 343/915 |
| 4,352,113 | 9/1982 | Labruyeré | 343/915 |
| 4,380,013 | 4/1983 | Slyah | 343/753 |
| 4,426,821 | 1/1984 | Moore et al. | 52/646 |
| 4,475,323 | 10/1984 | Schwartzberg et al. | 52/111 |
| 4,524,552 | 6/1985 | Hujsak | 52/108 |
| 4,539,786 | 9/1985 | Nelson | 52/645 |
| 4,557,097 | 12/1985 | Mikulas, Jr. et al. | 52/646 |
| 4,558,551 | 12/1985 | Sevelinge et al. | 52/646 |
| 4,578,919 | 4/1986 | Amadon et al. | 52/645 |
| 4,578,920 | 4/1986 | Bush et al. | 52/645 |
| 4,587,777 | 5/1986 | Vasques et al. | 52/108 |
| 4,604,844 | 8/1986 | Mikulas, Jr. et al. | 52/632 |
| 4,642,652 | 2/1987 | Herbig et al. | 343/915 |
| 4,677,803 | 7/1987 | Mikulas, Jr. et al. | 52/646 |
| 4,745,725 | 5/1988 | Onoda | 52/646 |
| 4,755,819 | 7/1988 | Bernasconi et al. | 343/915 |
| 4,764,779 | 8/1988 | Sato et al. | 343/897 |
| 4,769,647 | 9/1988 | Herbig et al. | 343/915 |
| 4,780,726 | 10/1988 | Archer et al. | 343/881 |
| 4,796,033 | 1/1989 | Rubin et al. | 343/912 |
| 4,862,190 | 8/1989 | Palmer et al. | 343/915 |
| 4,896,165 | 1/1990 | Koizumi | 343/881 |
| 4,932,807 | 6/1990 | Rhodes | 403/147 |
| 4,958,474 | 9/1990 | Adams | 52/646 |
| 4,989,015 | * 1/1991 | Chang | 343/915 |
| 5,014,484 | 5/1991 | Tanizawa et al. | 52/646 |
| 5,040,349 | 8/1991 | Onoda et al. | 52/646 |
| 5,104,211 | 4/1992 | Schumacher et al. | 359/853 |
| 5,125,206 | 6/1992 | Motohashi et al. | 52/646 |
| 5,162,811 | 11/1992 | Lammers et al. | 343/915 |
| 5,163,262 | 11/1992 | Adams | 52/646 |
| 5,198,832 | 3/1993 | Higgins et al. | 343/915 |
| 5,202,689 | 4/1993 | Bussard et al. | 342/10 |

(List continued on next page.)

FOREIGN PATENT DOCUMENTS

| | | |
|---|---|---|
| 0825677A2 | 2/1998 | (EP) . |
| 0892460A1 | 1/1999 | (EP) . |

*Primary Examiner*—Hoanganh Le
(74) *Attorney, Agent, or Firm*—Allen, Dyer, Doppelt, Milbrath & Gilchrist, P.A.

(57) ABSTRACT

A compactly stowable and deployable support architecture, such as may be used for supporting an energy directing surface, includes radial and hoop support members for deploying a surface, such as a mesh-configured antenna reflector. A multi-sided foldable hoop structure has a plurality of foldable joints, and generally radial struts that extend from and are foldable about corner joints of the hoop structure. At least one drive mechanism is coupled to torque tubes that drive geared hinges of the multi-sided hoop structure. The hinges and drive linkages are geared to synchronously unfold the multi-sided foldable hoop structure and the radial struts, so that the antenna surface may be smoothly deployed from its stowed condition.

27 Claims, 13 Drawing Sheets

U.S. PATENT DOCUMENTS

| | | | |
|---|---|---|---|
| 5,228,258 * | 7/1993 | Onoda et al. | 343/915 |
| 5,239,793 | 8/1993 | Chiapetta et al. | 52/108 |
| 5,257,034 | 10/1993 | Turner et al. | 343/915 |
| 5,307,080 | 4/1994 | Okumura | 343/915 |
| 5,421,376 | 6/1995 | Sinha | 139/419 |
| 5,440,320 | 8/1995 | Lach et al. | 343/915 |
| 5,446,468 | 8/1995 | Hiltz et al. | 342/386 |
| 5,446,474 | 8/1995 | Wade et al. | 343/915 |
| 5,451,975 | 9/1995 | Miller et al. | 343/915 |
| 5,488,383 | 1/1996 | Friedman et al. | 343/912 |
| 5,515,067 | 5/1996 | Rits | 343/912 |
| 5,574,472 | 11/1996 | Robinson | 343/915 |
| 5,635,946 | 6/1997 | Francis | 343/915 |
| 5,680,145 | 10/1997 | Thompson | 343/915 |
| 5,787,671 | 8/1998 | Meguro et al. | 52/653.1 |
| 5,818,395 | 10/1998 | Wolcott et al. | 343/753 |
| 5,864,324 * | 1/1999 | Acker et al. | 343/915 |
| 5,990,851 * | 11/1999 | Henderson et al. | 343/915 |
| 6,028,570 * | 2/2000 | Gilger et al. | 343/915 |

* cited by examiner

LIGHTWEIGHT, COMPACTLY DEPLOYABLE SUPPORT STRUCTURE

FIELD OF THE INVENTION

The present invention relates to support structures, such as but not limited to those for deploying energy directing surfaces (e.g., reflectors), in either terrestrial or space applications, and is particularly directed to a new and improved compactly stowable support architecture, having both radial and circumferential structural elements, that are configured to be compactly foldable, and to be controllably driven so as deploy an unfurlable medium, such as a mesh-configured reflector. The compact packaging configuration of the invention lends itself to being efficiently transported by and deployed by a spacecraft to support large reflector apertures. Scalability permits use in small aperture applications where compact launch volume is required.

BACKGROUND OF THE INVENTION

The use of large reflector structures for satellite communication networks is becoming more widespread as demand for mobile communications increases. As the required aperture size or number of reflectors per space-deployed communication site increases, the availability of lightweight, compactly packaged antenna structures is a key element in continuing industry growth.

A non-limiting example of an umbrella type and folded rib mesh reflector that has been deployed by the National Aeronautics and Space Administration (NASA) for over a quarter of century is the Tracking Data Relay System (TDRS) reflector antenna system. In its deployed state, the metallic mesh reflector structure of the TDRS system measures 4.8 meters in diameter; however, when folded, it readily fits within a cylindrical volume approximately one meter in diameter and three meters in length. Each satellite in the deployed TDRS constellation employs two such antennae. In addition to the TDRS antenna system, commercial mobile communications systems that employ two mesh reflectors, each having an aperture size of twelve meters are also in production. Each of these reflectors, with folding ribs, is sized to fit within a cylindrical volume approximately one meter diameter and four and one-half meters in length. By folding the ribs, the same TDRS-configured volume, moderately lengthened, can package a reflector over twice the TDRS size.

There are varieties of other reflector designs in which rigid elements are oriented in either a radial direction from the reflector center or a circumferential direction at the reflector periphery, and may employ foldable rigid elements to improve packaging. Non-limiting examples of such prior art antenna structures include the following U.S. Patents: U.S. Pat. Nos. 5,787,671; 5,635,946; 5,680,145; 5,451,975; 5,446,474; 5,198,832; 5,104,211; and 4,989,015.

SUMMARY OF THE INVENTION

In accordance with the present invention there is provided a new and improved structure geometry, either deployable or non-deployable, that includes both radial and circumferential structural support members to support a reflecting surface, such as a mesh-configured antenna surface. Employing both radial and circumferential support members allows the invention to adapt to a wide variety of geomtries and is not limited to only symmetric structures. The invention may be applied to any structure requiring a generally polygonal shape having a unique geometry at its periphery.

As described herein, the support structure of the invention may be implemented in either of two embodiments or configurations. Both employ a regular polygonal inner hoop and generally radial struts. The difference between the two configurations involves the location and design of the tips or distal ends of the radial struts.

In the first configuration, distal ends of adjacent radial struts are hinged together in pairs to form the corner of a triangle, a subtended side of which is one side of an interior hoop structure. In the second configuration distal ends of radial struts are not hinged together. Interconnecting distal ends of the radial struts in the first configuration reduces internal member loads for structures having a relatively small (generally less than six) number of sides. The second configuration (where the radial struts are not joined together) facilitates implementing relatively large architectures (having four or more sides); however, there is an increase in internal member loads.

Due to the high cost to place systems in space, the structure's deployment reliability must be ensured to the maximum extent possible. This reliability can be achieved through slow, controlled, synchronous deployment. By synchronizing the hinges, the position of each rigid element in the structure is known and predictable throughout all stages of deployment. This enhances reliability and reduces dynamics. Moreover, the rate of deployment can be more readily controlled by design of the hinge mechanism and drive system.

In accordance with the first embodiment of the invention, distal ends of respective pairs of adjacent upper radial struts that extend from corner joints of a segmented or multi-sided foldable hoop support structure are hinged together. Mid-points of alternate upper segmented radial strut elements are hinged together by folding mid-strut hinge joints. The mid-strut hinge joints allow the hinged together upper radial strut pairs to be folded about hoop structure corner hinge joints and stowed generally parallel to a respective hoop element of the foldable hoop structure. The upper radial struts are connected to corner joints of the hoop structure by multi-axis, synchronously driven hinges. As will be described, these synchronously driven corner hinges may employ relatively non-complex pin joints, so as to allow the structure to be deployed into a three-dimensional shape with relative simple kinematics. In addition, all driven hinges are tied together via torsion tubes and gears, so that the hinges are effectively synchronized. This allows all hinges to be driven by a single motor to deploy the entire support structure. Alternatively, multiple motors may be installed for deployment redundancy. The drive motor may be installed at any convenient location along the torsion tubes.

As a non-limiting example, the multi-sided foldable hoop structure of the first embodiment of the invention may contain six rigid hoop members or legs, the length of each of which is approximately the same as the length of a respective upper radial strut. The hoop members are hinge-connected to one another in end-to-end fashion at the driven hinge joints, so as to define a generally polygonal (e.g., hexagon)-shaped hoop structure. In addition to providing attachment points to the hoop corner joints for upper radial struts, a respective hinge joint is coupled to an additional radial, bottom strut.

Tensioned cords of an upper tensioning ring tie together distal ends of successive ones of the plurality of upper radial strut. Lower cords of a lower tensioning ring tie together distal ends of the lower (i.e. bottom) radial struts. Additional, tension-only cord elements interconnect distal ends of the upper radial struts with distal ends of the lower radial struts. The tensioning cord elements and the upper and lower tensioning rings stabilize the distal ends of the radial struts and impart stiffness to the support structure.

In the second embodiment of the present invention, distal ends of radial strut elements are not hinged together to form outer perimeter hinged corner joints. Instead, distal ends of the upper radial strut elements are coupled to tensioning cords of an upper tensioning ring. Also, distal ends of lower radial strut elements are coupled to tensioning cords of a lower tensioning ring. In addition, a respective side of the hoop structure is segmented into a pair of hoop elements that are joined together at midpoint by means of a driven mid-strut hinge joint. The upper and lower radial struts are coupled to corner joints of the hoop structure by multi-axis driven hinge joints. Each of the driven corner and mid-strut hinge joints is synchronously driven to enable the structure to fold in a manner consistent with powered, synchronous deployment. Additional tension-only cord elements interconnect successively adjacent distal ends of upper radial struts with successively adjacent distal ends of lower (bottom) radial struts. As in the first embodiment, these tensioning cord elements and the upper and lower tensioning rings function to stabilize the distal ends of the radial struts and impart stiffness to the entire structure.

A standard tensioning cord truss attachment framework may be used to attach an unfurlable energy directing surface to the hoop structure. Because there are relatively few interfaces between the hoop support structure and the cord truss network, parallel, independent, assembly of the energy directing surface and the hoop support structure is facilitated. In essence the attachment points between the cord truss network and the hoop structure are the distal ends of the upper radial struts and the distal ends of the lower radial struts, as well as an attachment point at the center of the cord truss network.

During manufacture, individual cord truss elements of an upper cord truss assembly may be assembled as generally planar shaped structures, which are integrated into a two-dimensional network along with the tensioned, mesh fabric used to focus reflected energy, such as RF or solar energy. An arrangement of network-to-structure cords may be assembled to tooling and the cord truss network attached. The overall mesh and its supporting cord-truss assembly may then be positioned to conform with a prescribed accuracy specification. The surface may be set on the tooling while preparations of the structure are performed in parallel. Once the reflective surface is properly adjusted and the structure is assembled, the surface may be removed from the tooling and integrated with the support structure. An adjustment to correct differences between the tooling and the as-built structure can be readily carried out by adjusting only the attachment points.

An alternative configuration of the hoop structure of the second embodiment of the invention may employ a four-bar linkage and drive platform linkage installed at the respective mid-side and corners of the hoop structure. An advantage of this embodiment is that it reduces hardware complexity by removal of the gearing mechanisms. However, it also doubles the number of components within the hoop itself, which may not be a desirable trade-off from a cost or packaging standpoint.

DETAILED DESCRIPTION

Figure 1:
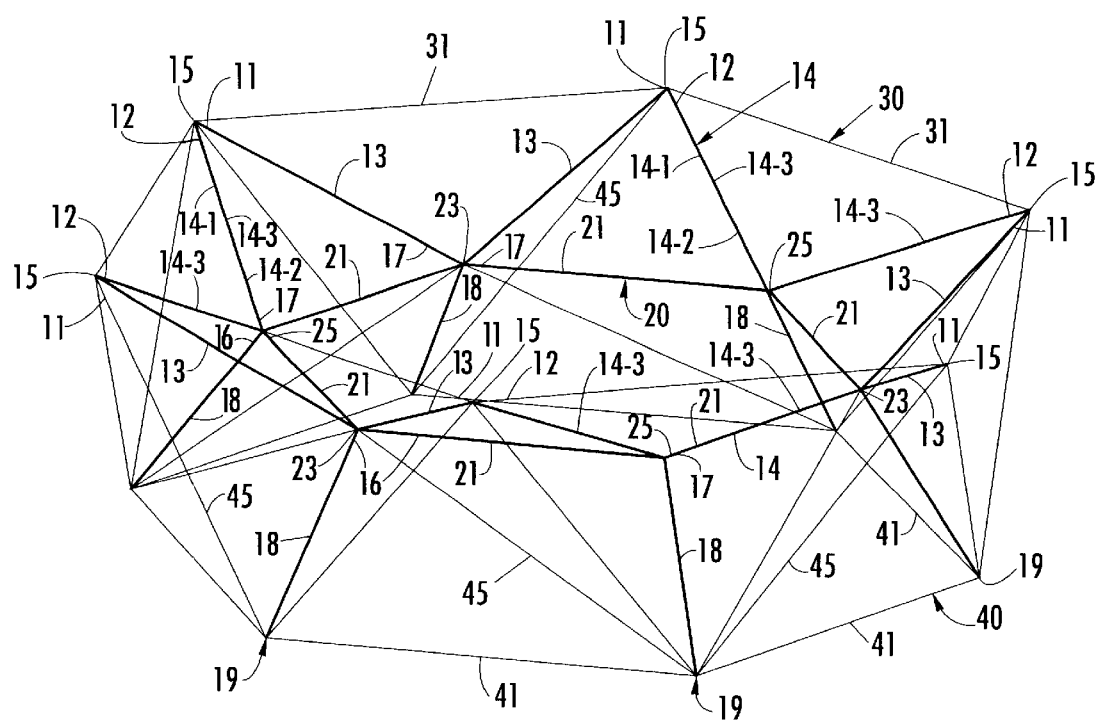
FIG. 1 is a diagrammatic perspective view of a six-sided support architecture, deployed by means of three side units formed of foldable hoop members or legs of a first embodiment of the present invention.

Attention is initially directed to FIG. 1, which is a diagrammatic perspective view of a six-sided support architecture, deployed by means of three side units formed of foldable hoop members or legs of a first embodiment of the present invention. In the embodiment of FIG. 1, distal ends of radial strut elements are joined together by means of outer perimeter hinge joints. In the diagrammatic illustration of FIG. 1, bold lines represent the rigid elements of the support structure, and cable or rope-like (tension only) elements are represented by thinner lines.

In the non-limiting example of a six-sided support architecture, the embodiment of FIG. 1 is formed of three side sections, with a respective side section (shown in detail in FIG. 13, to be described) being configured of a pair of folding hoop members or legs 21. The length of a respective hoop member of leg 21 is the same as that of other hoop members and is generally the same length as a respective non-segmented or continuously rigid upper radial strut 13. The hoop elements 21 are hinge-connected to one another in end-to-end fashion at hinge joints 23 and 25, so as to define a regular polygonal shaped hoop structure.

In addition to providing attachment points to the hoop members 21 for adjacent pairs of the non-segmented upper radial struts and adjacent pairs of segmented upper radial struts, each hinge joint 23 and 25 is coupled to an interior end 16 of a further radial bottom strut 18. Synchronously driving the corner hinges 23 and 25 (shown in detail in FIGS. 24 and 25, to be described) enables the structure to fold in a manner consistent with powered, synchronous deployment, as will be described below with reference to FIGS. 3–7.

Pursuant to the first embodiment of the invention, distal ends 11 of each of a plurality (e.g., pair) of adjacent upper non-segmented radial struts 13, and distal ends 12 of each of a plurality (e.g., pair) of adjacent upper segmented radial struts 14 are hinged together by means of passive (non-driven) hinges installed at a plurality of outer perimeter corner joints 15 (to be described with reference to FIG. 24).

Figure 24:
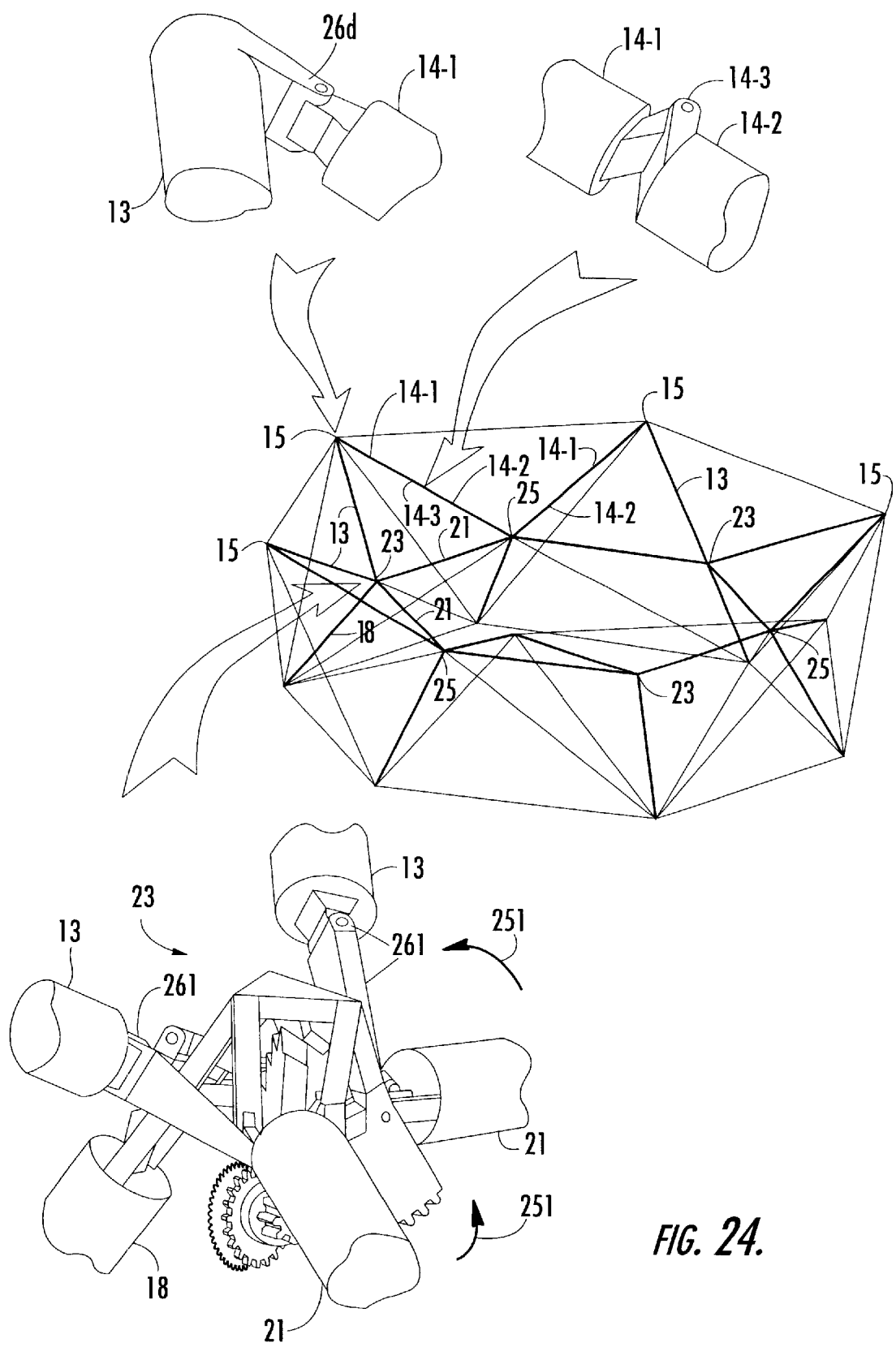
FIG. 24 shows details of a respective geared corner hinge and the details of a folding radial member with its distal and mid hinge joints for the first embodiment of the invention.
Figure 25:
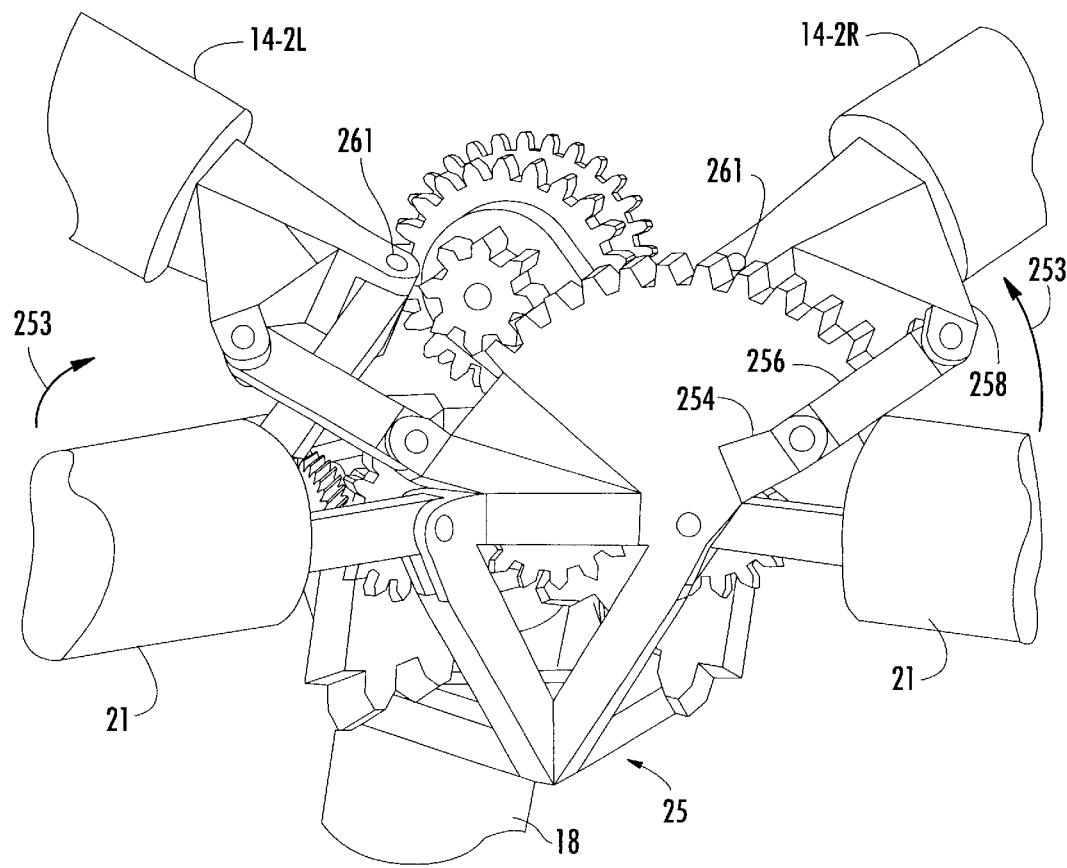
FIG. 25 shows details of a hinge that is installable at a respective mide side of the hoop structure of the first embodiment of the invention.

Each of the upper segmented radial struts 14 is comprised of a pair of radial strut elements 14-1 and 14-2, that are connected at a folding mid-strut hinge joint 14-3 (shown in detail in FIG. 24, to be described). The mid-strut hinge joints 14-3 allow a respective non-segmented upper radial strut 13 to be folded about hoop corner hinge joints and stowed generally parallel to a respective hoop member 21 of the interior, polygonal folded hoop structure 20. Interior ends 17 of the upper radial struts 13 and 14 extending from adjacent outer perimeter joints 15 are connected to the hoop members 21 of the hoop structure 20, by means of a plurality of multi-axis driven hoop hinge joints 23 and 25. It should be noted that the hoop hinges 23 and 25, while similar in function, are differently configured, as shown in FIGS. 24 and 25. Hinge joints 23 support the non-segmented upper radial struts 13, while hinge joints 25 support the segmented upper radial struts 14. In addition, hinge joints 23 and 25 may comprise relatively non-complex pin joints, to allow the structure to be deployed into its three-dimensional shape with relatively simple kinematics.

Circumferentially tensioned, upper cords 31 of an upper tensioning ring 30 tie together successive ones of the plurality of outer perimeter corner joints 15, while circumferentially tensioned, lower cords 41 of a lower tensioning ring 40 tie together distal ends 19 of successive ones of the plurality of the lower or bottom radial struts 18. Additional, tension-only cord elements 45 interconnect successively adjacent outer perimeter corner joints 15 at the distal ends 11 of the upper radial struts 13 and 14 with distal ends 19 of the lower radial struts 18. Tensioning cord elements 45 and the upper and lower tensioning rings 30 and 40 function to stabilize the distal ends of the upper and lower radial struts and impart stiffness to the entire structure.

Figure 2:
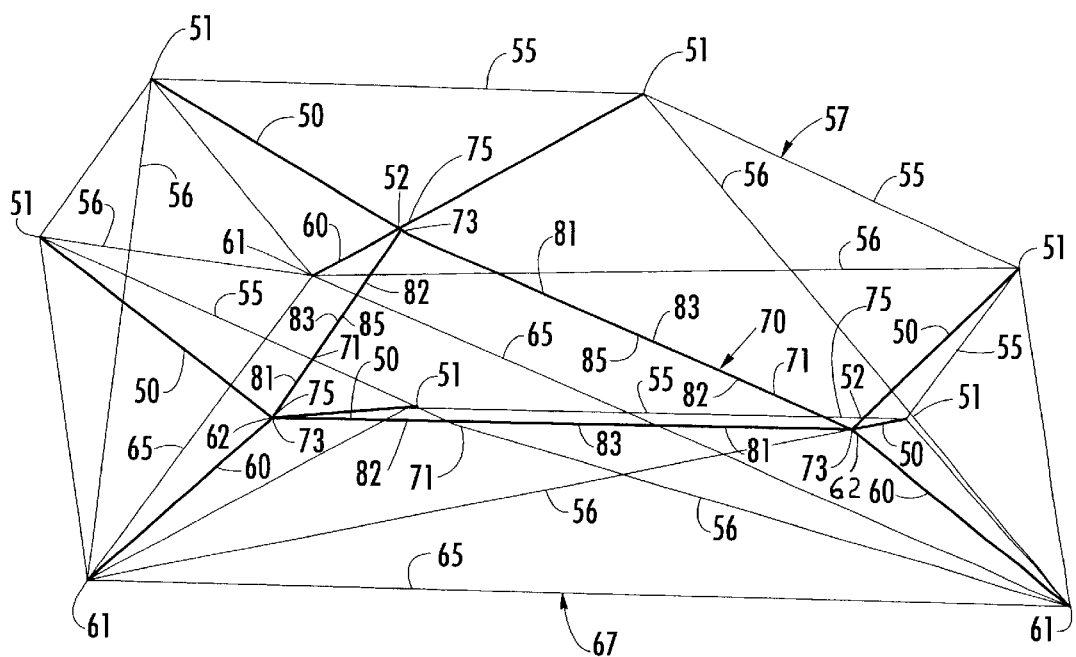
FIG. 2 is a diagrammatic perspective view of a three-sided support architecture in accordance with a second embodiment of the present invention.
Figure 4:
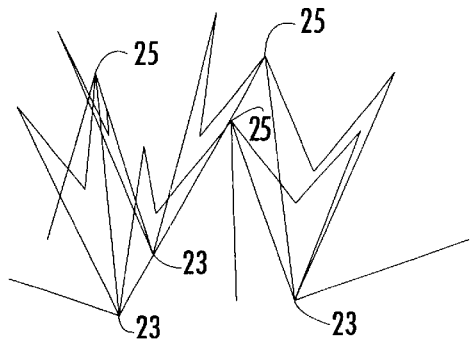
FIGS. 3–7 show the support architecture of FIG. 1 during successive phases of its deployment.

FIG. 2 is a diagrammatic perspective view of a three-sided support architecture in accordance with a second embodiment of the present invention, wherein distal ends 51 of upper radial strut elements 50 and distal ends 61 of lower radial strut elements 60 are not hinged together to form outer perimeter hinged corner joints. Instead, the distal ends 51 of upper radial strut elements 50 are joined together by circumferential tensioning cords 55 of an upper tensioning ring 57. Also, distal ends 61 of lower radial strut elements 60 are joined together by circumferential tensioning cords 65 of a lower tensioning ring 67.

Figure 21:
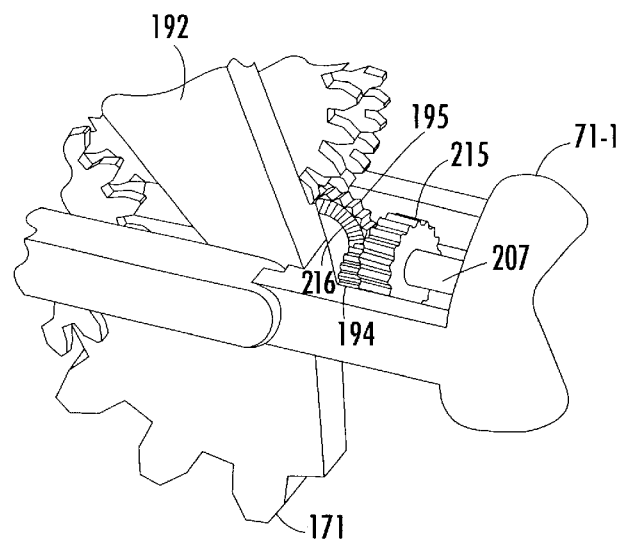
FIGS. 19, 19A, 20 and 21 show details of a hinge installable at a respective mid-side of a linear hoop member of the second embodiment of the invention.
Figure 19:
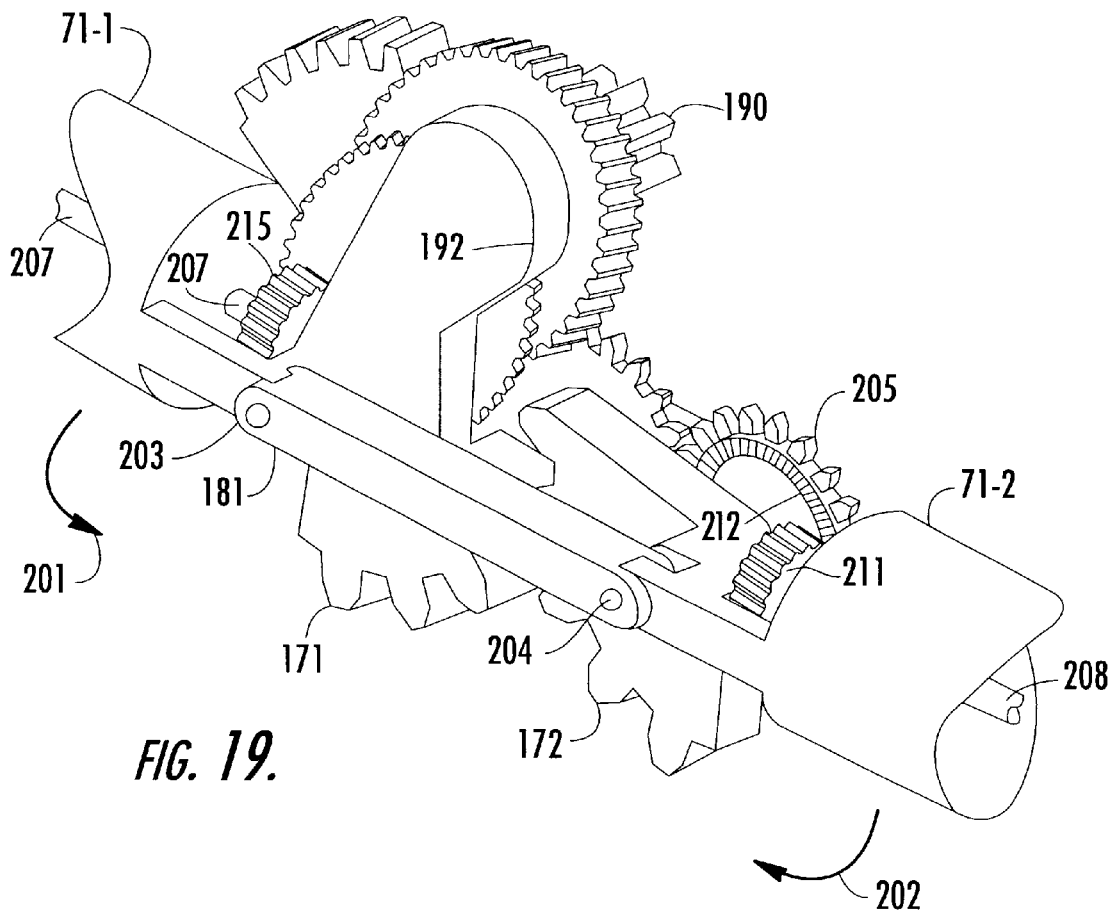
Figure 20:
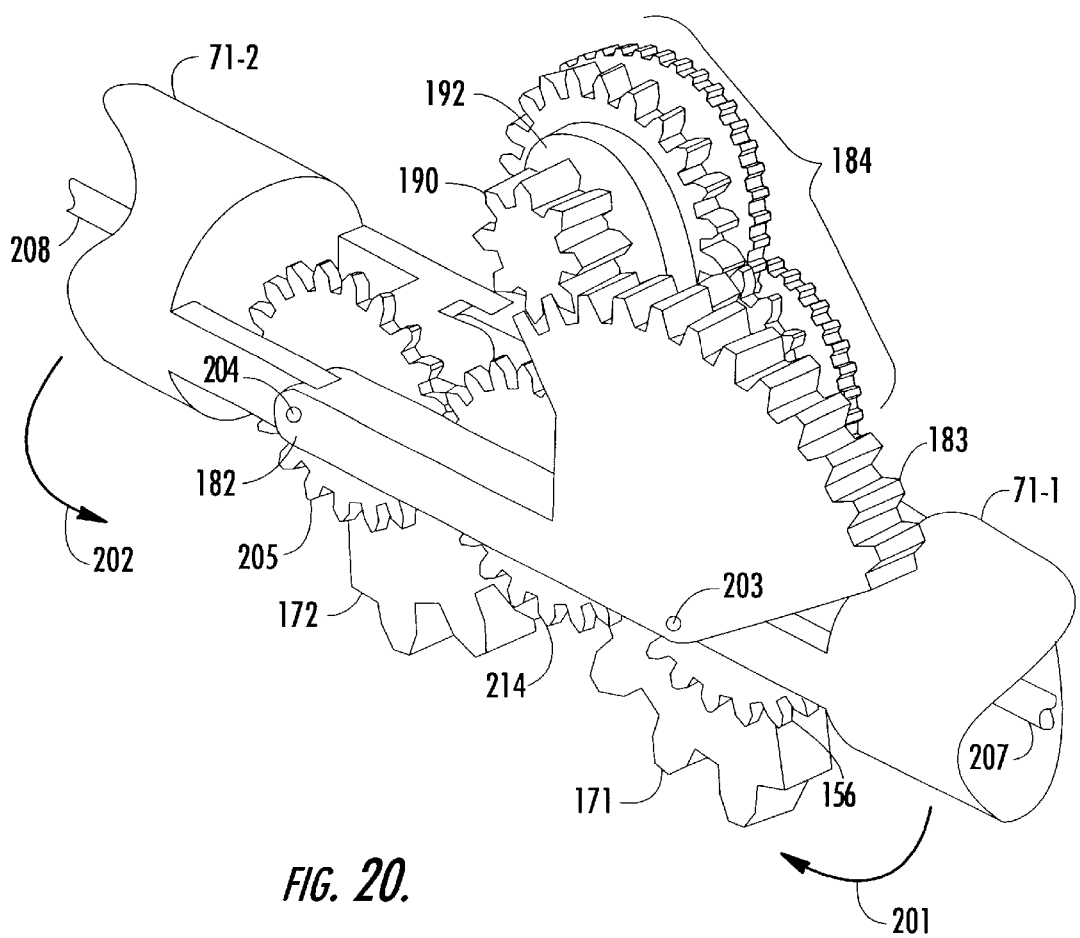

In addition, a respective side 71 of an interior multi-sided (polygonal) hoop structure 70, from side corner joints 73 of which the radial struts 50 and 60 extend, is comprised of a pair of hoop members 81 and 82, that are joined together at a midpoint 83 of the side 71 by means of a driven hinge 85 (shown in detail in FIGS. 19–21, to be described). Interior ends 52 of the strut elements 50 and interior ends 62 of the strut elements 60 are secured to side corner joints 73 of the multi-sided hoop structure 70 by means of a plurality of multi-axis driven hoop hinges 75 (shown in detail in FIGS. 22 and 23, to be described). Each of the driven hoop hinges 75 and 85 is synchronously driven to enable the structure to fold in a manner consistent with powered, synchronous deployment, as will be described below with reference to FIGS. 8 to 12.

Additional tension-only cord elements 56 are used to interconnect successively adjacent distal ends 51 of the upper radial struts 50 with successively adjacent distal ends 61 of the lower radial struts 60. As in the first embodiment, these tensioning cord elements 56 and the upper and lower tensioning rings 57 and 67, respectively, function to stabilize the distal ends of the radial struts and impart stiffness to the entire structure.

FIGS. 3 through 7 diagrammatically illustrate the deployment sequence for the foldable hoop structure of the first embodiment of the invention shown in FIG. 1, beginning with its stowed configuration (FIG. 3), through successive 25%, 50%, 75% partially deployed conditions, to the fully deployed condition (FIG. 7) of the hinged hoop architecture. In order to avoid complicating the drawings, only the rigid radial struts and hoop members are shown in FIGS. 3–7.

Figure 3:
Figure 5:
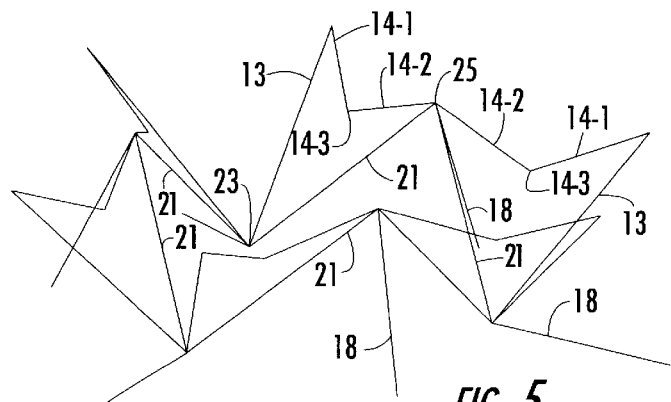
Figure 6:
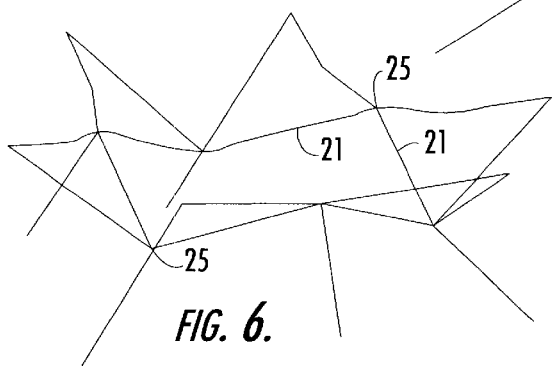
Figure 7:
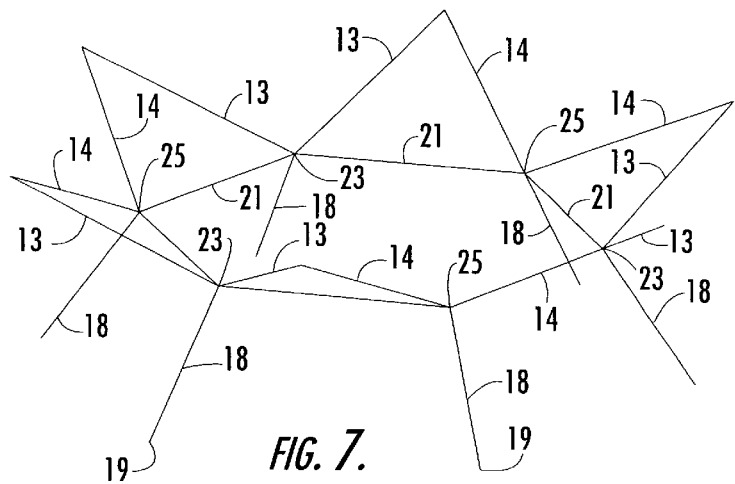
Figure 9:
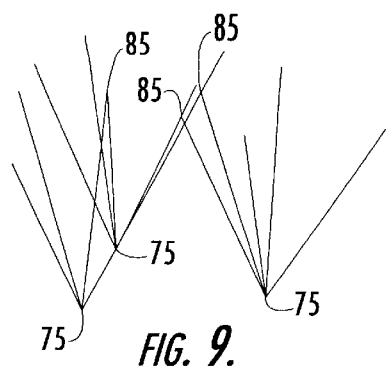
FIGS. 8–12 show the support architecture of FIG. 2 during successive phases of its deployment.
Figure 13:
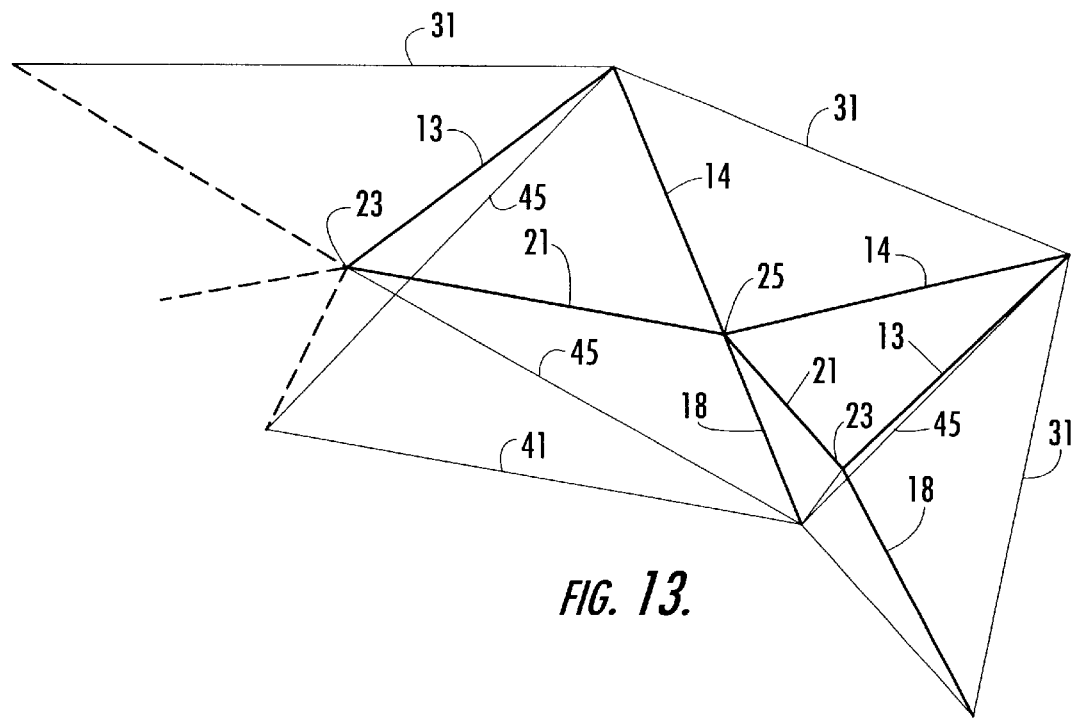
FIG. 13 shows the configuration of a respective side unit of the embodiment of FIG. 1.

As shown therein, by synchronous operation of the driven hinges 23 and 25, the hoop members 21 deploy from a generally vertical direction in their stowed condition of FIG. 3 to a generally horizontal direction in their fully deployed condition of FIG. 7. In the 50% deployed condition of FIG. 5, the non-segmented upper radial struts 13 have pivoted or rotated outwardly from the hoop corner hinge joints 23, while the two halves 14-1 and 14-2 of the segmented upper radial struts 14 have partially opened from their folded stowed condition. The lower radial struts 18 are also pivoted outwardly by the driven hinges 23 and 25 from their generally vertical condition in the stowed state of FIG. 3 to their deployed condition in FIG. 7. FIG. 13 shows the configuration of a side unit of the embodiment of FIG. 1, as fully deployed in FIG. 7.

In the fully deployed condition of FIG. 7, the two halves 14-1 and 14-2 of a respective segmented upper radial strut 14 have fully opened, so as to form a generally equilateral triangle structure with an adjacent non-segmented radial strut 13 and a respective hoop member 21. The lower radial struts 18 are also rotated or pivoted outwardly by the driven hinges 25 from their vertical condition in the stowed state of FIG. 3 to their deployed condition in FIG. 7. As pointed out above, the distal end 19 of the lower radial strut 18 provides a cord attachment point to distributing the loads of the upper and lower tensioning rings. The folded struts 14 also improve the distribution of deployed loads, especially in the upper tensioning ring.

FIGS. 8 through 12 diagrammatically illustrate the deployment sequence for the foldable hoop structure of the second embodiment of the invention shown in FIG. 1, beginning with its stowed configuration (FIG. 8), through successive 25%, 50%, 75% partially deployed conditions, to the fully deployed condition (FIG. 12) of the hinged hoop architecture. Again, as in the deployment sequence of FIGS. 3–7, to avoid unnecessarily complicating the drawings, only the rigid elements are shown in FIGS. 8–12. No flexible, tension-only elements are shown.

Figure 8:
Figure 10:
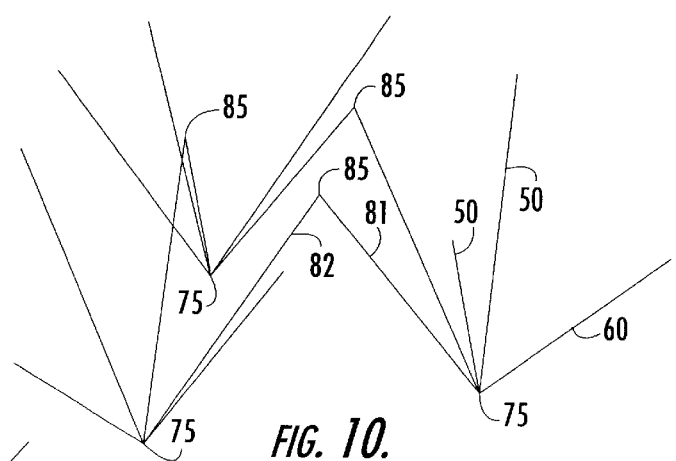
Figure 11:
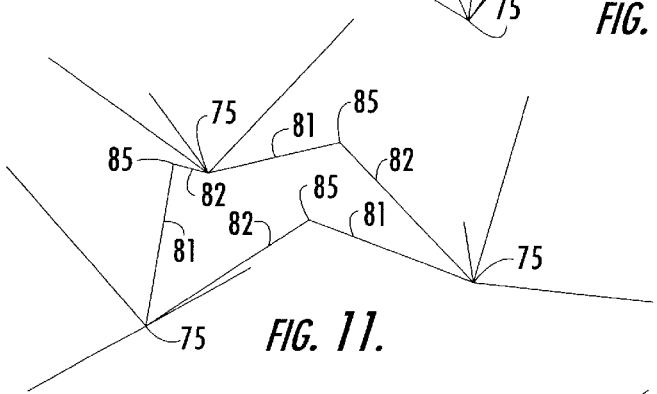
Figure 12:
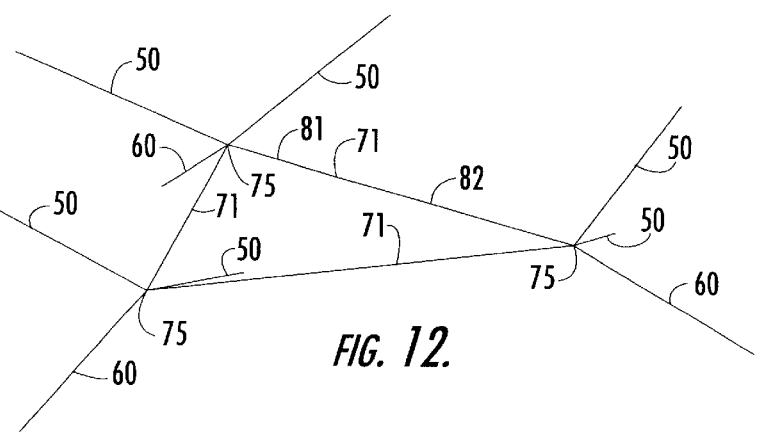

As shown therein, by synchronous operation of the driven corner and midpoint hinges 75 and 85, respectively, the hoop members 71 deploy from a generally vertical direction in their stowed condition of FIG. 8 to a generally horizontal direction in their fully deployed condition of FIG. 12. In the 50% deployed condition of FIG. 10, the upper radial struts 50 and lower radial struts 60 have pivoted or rotated outwardly from the corner hinge joints 75, while the two hoop member halves 81 and 82 of a respective side 71 of the interior multi-sided (polygonal) hoop structure 70 have partially opened from their folded stowed condition.

Figure 14:
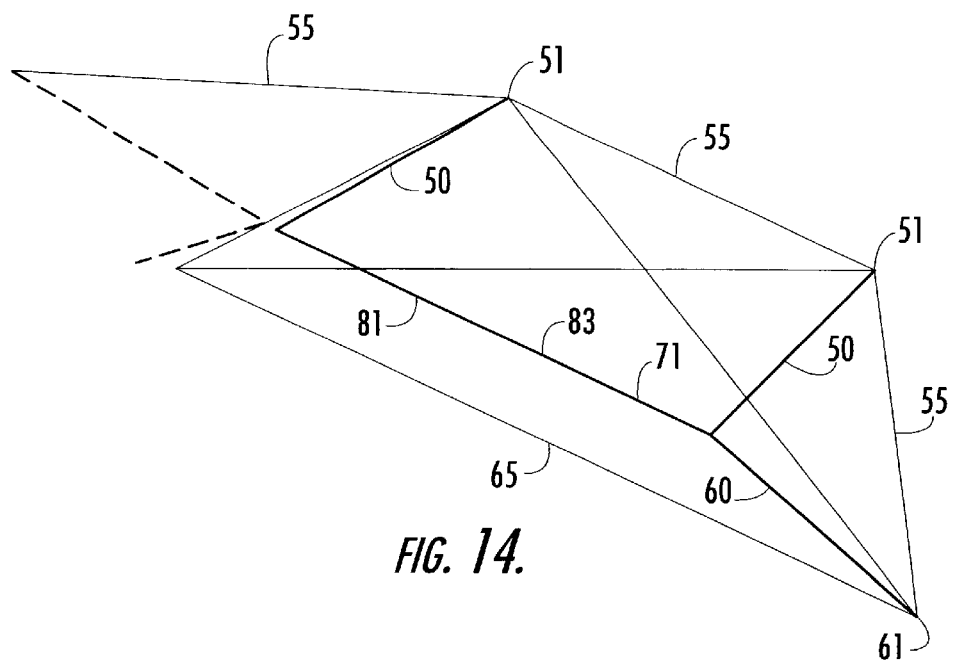
FIG. 14 shows the configuration of a respective side unit of the embodiment of FIG. 2.

In the fully deployed condition of FIG. 12, the two halves 81 and 82 of a respective hoop member 71 have fully unfolded into a generally collinear configuration, so as to form an equilateral triangle structure with unfolded collinear halves of the other two adjacent hoop members 71. Also, the respective upper and lower radial struts 50 and 60 are now fully rotated or pivoted outwardly by the driven corner hinges 75 from their generally vertical condition in the stowed state of FIG. 8 to their deployed condition of FIG. 12. FIG. 14 shows the configuration of a respective side unit of the embodiment of FIG. 2, as deployed in FIG. 12.

The two embodiments of FIGS. 1 and 2 appear to be different, in that the first embodiment (FIG. 1) forms a six-sided polygon, while the second embodiment (FIG. 2) forms a triangle. However,each of these embodiments is formed of a three 'side units', respective ones of which are shown in FIGS. 13 and 14. Each side unit is based upon hoop members or legs, shown at 21 in FIG. 13 and at 71 in FIG. 14). The differences between the two embodiments derive from the geometries of the hinges 25 of FIG. 13 and 83 of FIG. 14 and, as described previously, the implementations of the upper radial struts 13 and 14 of FIG. 13 and upper radial struts 50 in FIG. 14.

In addition, the hinge 25 of the first embodiment of FIG. 13 supports a lower or bottom radial strut 18, while in the second embodiment of FIG. 14, the hinge 83 does not support a lower radial strut. Geometrically, the hinge 25 of the first embodiment of FIG. 13 incorporates a bend that is generally equal in angle to the bend of the corner hinge 23, so as to form a generally hexagonally shaped structure. Configuring the side units of the respective embodiments in this manner allows them to be used as 'building blocks' that can be replicated and interconnected around a centerline of the structure, to realize a polygonal architecture of an arbitrary number of sides.

Figure 15:
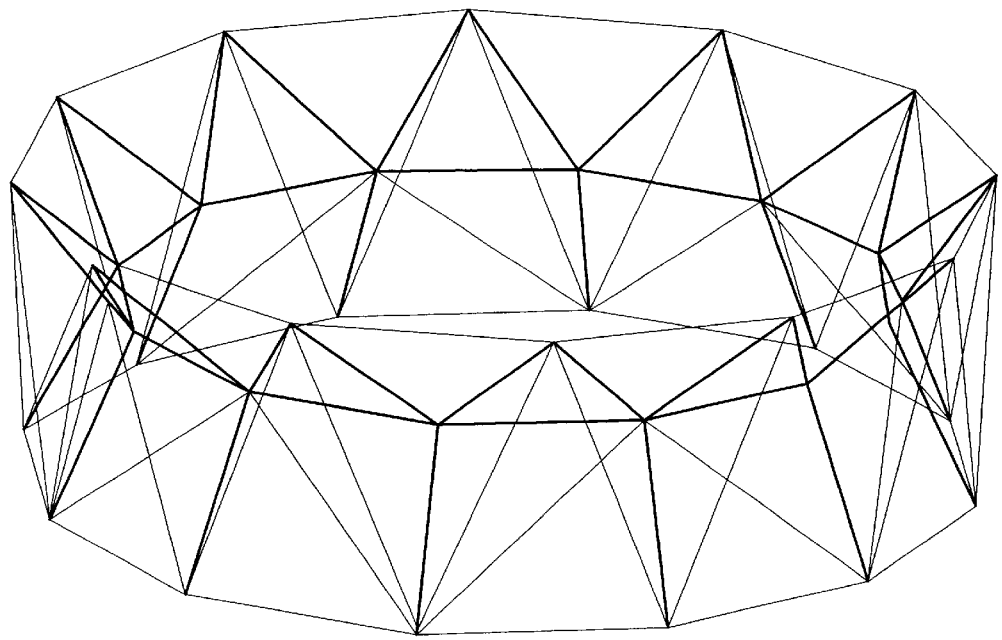
FIG. 15 a diagrammatic perspective view of a twelve-sided support architecture formed of six side units of the first embodiment of the present invention.
Figure 16:
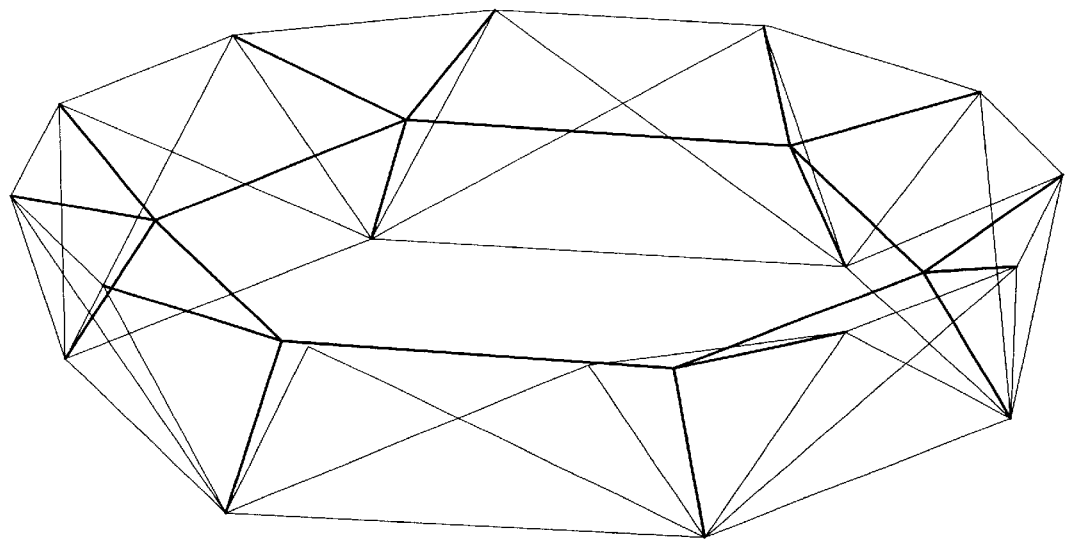
FIG. 16 is a diagrammatic perspective view of a six-sided support architecture formed of six side units of the second embodiment of the present invention.

Thus the size of the structure may be increased by adding more side units. As a non-limiting example, for structures larger than those of FIGS. 1 and 2, the number of hoop sides may be increased to twelve, using six of the side units of the first embodiment, as shown diagrammatically in FIG. 15), or to six, using six of the side units of the second embodiment, as shown diagrammatically in FIG. 16). As the number of sides of the interior hoop increases, the stowed length decreases, and the stowed diameter increases. This trade-off provides a reasonable degree of design flexibility to adapt to a wide range of stowed volume requirements.

The need for improved load distribution, hence the need for the additional elements of the first embodiment, diminishes with an increase in the number of sides of the hoop structure. The two hoop structure configurations described above allows the choice of a structure having fewer powered hinges in situations where a longer stowed length is afforded. In general, given a required deployed diameter, the stowed length of the configuration of the first embodiment will be approximately twice that of the configuration of the second embodiment; however, it will employ only half the number of powered or driven hinges.

Figure 17:
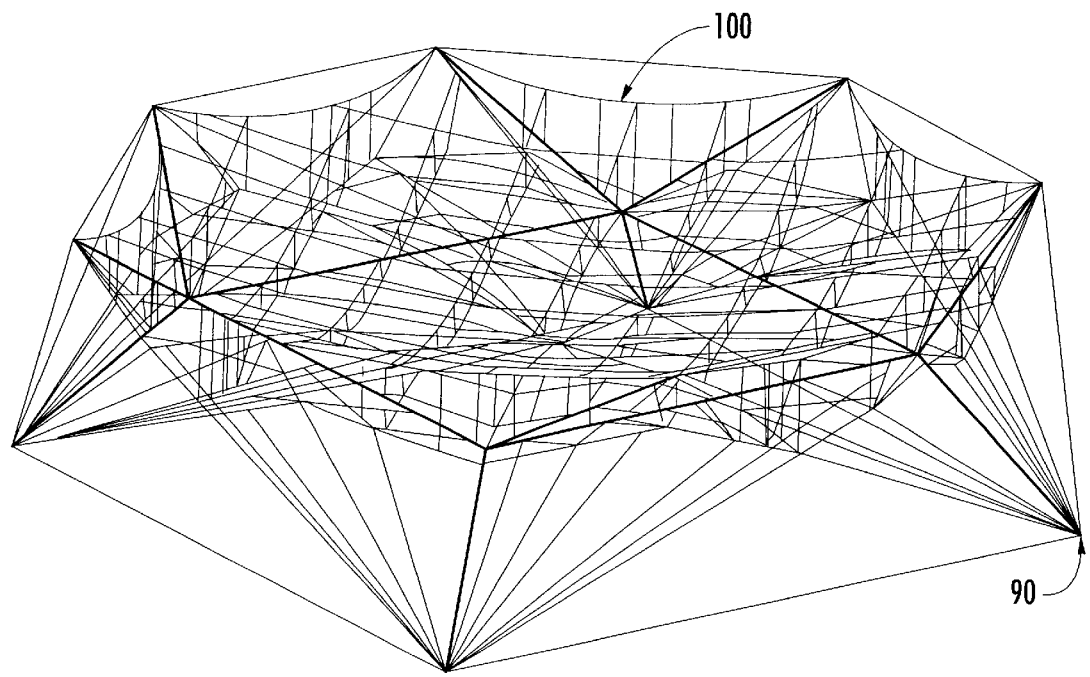
FIG. 17 illustrates the use of a four-sided support architecture in accordance with the second embodiment of the present invention to support a tensioned cord truss arrangement for a metallic mesh, reflective surface.
Figure 18:
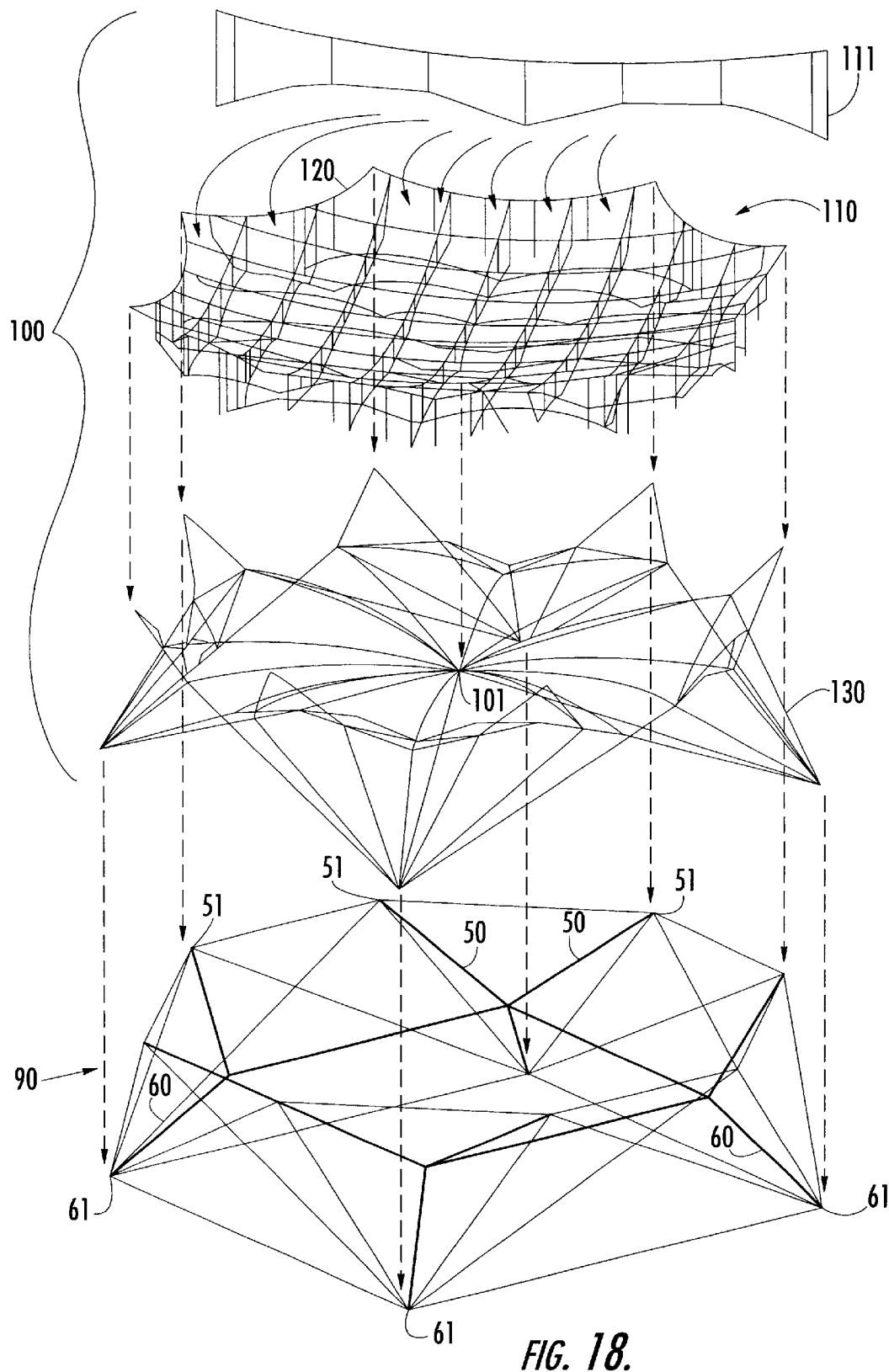
FIG. 18 is an exploded view depicting the overall assembly of the structure of FIG. 17.

As diagrammatically illustrated in assembled view of FIG. 17, and the exploded view of FIG. 18, which show a four-sided hoop support architecture 90 in accordance with the second embodiment of the present invention, mounting a reflective surface to the hoop structure is straightforward. The four-sided hoop support configuration of FIGS. 17 and 18 employs a standard tensioning cord truss attachment framework 100 to attach a surface, such as an electrically conductive (metallic) mesh reflective surface (not illustrated) that is reflective of electromagnetic energy, to underlying hoop support structure 90.

Advantageously, in the course of assembling the tensioning cord truss framework 100 and attaching it to the support structure 90, there are relatively few interfaces between the hoop support structure 90 and the cord truss network 100. This facilitates parallel, yet independent, assembly of the antenna surface and the hoop support structure. As shown in the exploded view of FIG. 18, there are two sets of attachment points or interfaces between the cord truss network 100 and the hoop structure 90: 1—the distal ends 51 of the upper struts 50; and 2—the distal ends 61 of the lower struts 60. There is also an attachment point at the center 101 of the cord truss network 100. This means that for the four-sided configuration of FIGS. 17 and 18 only thirteen interface points are required.

In the course of manufacture of the embodiment of FIGS. 17 and 18, individual cord truss elements 111 of an upper cord truss assembly 110 are manufactured as individual generally planar shaped structures. These planar shaped structures elements 111 are then integrated into a two-dimensional network 120, along with the material used to reflect and focus energy. For an RF antenna this material may comprise a tensioned, metal mesh fabric. An arrangement of network-to-structure cords 130 is assembled to tooling and the cord truss network 120 is attached.

At this point, the entire reflective component of the system and its supporting cord-truss assembly is ready to be geometrically positioned so as to conformed with a pre-scribed accuracy specification. The surface can be set on the tooling while preparations of the structure are performed in parallel. Once the reflective surface is properly adjusted and the structure is assembled, the surface can be removed from the tooling and integrated with the structure. A final adjustment to correct differences between the tooling and the as-built structure can be readily carried out by adjusting only the interface points. These relatively few interface points also provide practical locations for implementation of in-orbit or remote adjustment, to improve or correct for in-service disturbances of the deployed structure.

Figure 22:
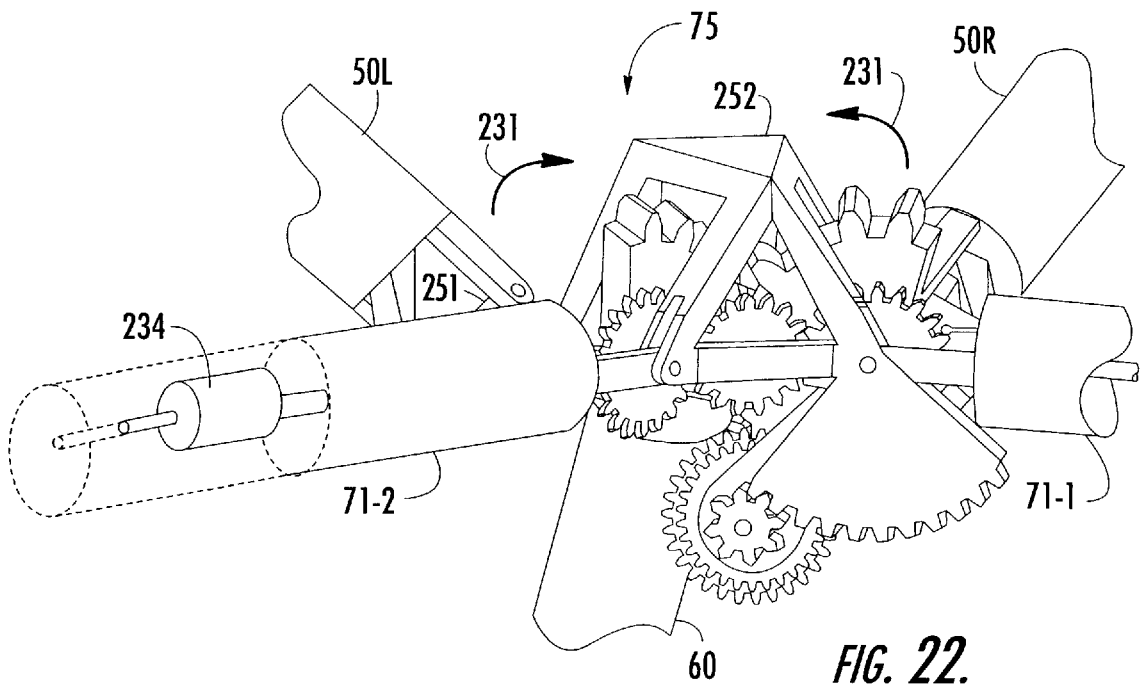
FIGS. 22 and 23 show details of a hinge that is installable at a respective corner joint of the hoop structure of the second embodiment of the invention.
Figure 23:
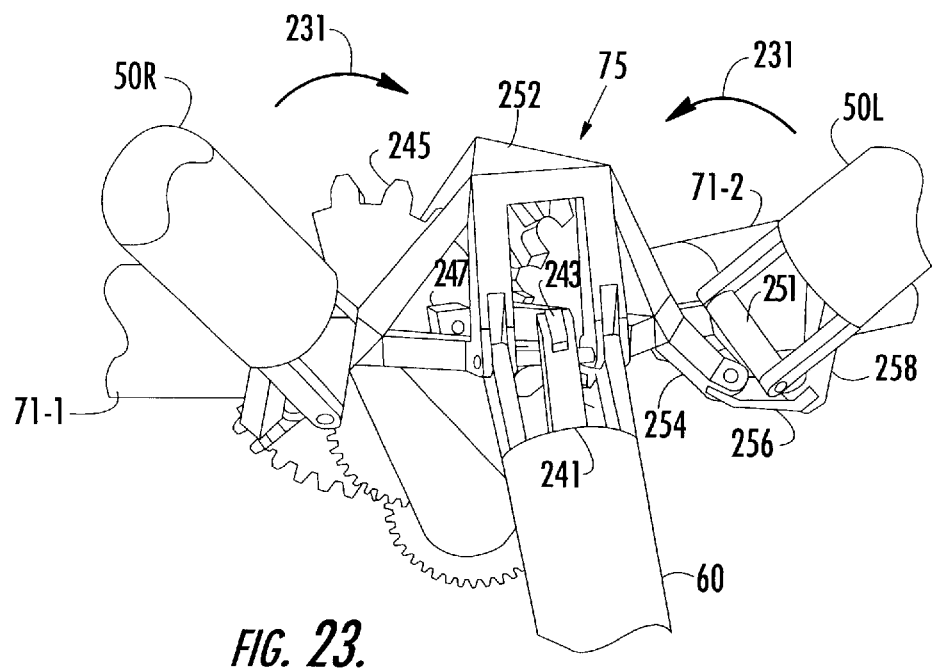

As described above, to deploy the hoop structure from its stowed condition to its fully deployed state in a slow, controlled and synchronized fashion, the present invention uses a gear driven hinge arrangement configured as shown in FIGS. 19, 20 and 21, and installable at the hoop mide side joints 83 of the second embodiment of FIG. 2, and gear driven corner joint hinge arrangements, configured either as shown in FIGS. 22 and 23 for installation at corner joints 75 for the second embodiment of the invention, or configured as shown in FIGS. 24 and 25 for installation at corner joints 25, for the first embodiment of the invention.

More particularly, FIG. 19 shows a front view of the linear hoop gear-driven hinge arrangement for a fully deployed condition (collinear alignment) of the hoop elements that extend on either side of a mid hinge joint.

FIGS. 20 and 21 show rear views of this linear hoop gear driven hinge arrangement. In each of the Figures the bold arrows 201 and 202 indicate the closing (stow) direction of respective ones of generally cylindrically configured hoop segments 71-1 and 71-2.

Respective synchronization gears 171 and 172 are rigidly affixed to or solid with respective hoop members 71-1 and 71-2. Hoop members 71-1 and 71-2 attach to longitudinal platform members 181 and 182, respectively, via pinned pivots 203 and 204. These gears and platform members maintain the hoop members in dynamic and static symmetry (synchronization) with respect to each other at each stage of deployment. Stated another way, the angle between the platform member 181 and hoop member 71-1, and the angle between platform member 182 and hoop member 71-2 will be the same throughout all stages of deployment.

The force used to deploy (or stow) the hinge is provided by a drive gear 190 that is rigidly attached by means of a gear housing 192 to hoop member 71-1 and the synchronization gear 171. Motion of the drive gear 190 turns rotates a platform gear element 183 to open (or close) the platform 182 with respect to the hoop member 71-1. By virtue of the synchronization gears 171 and 172, the angle between hoop member 71-1 and platform member 181 is transferred to the angle between hoop member 71-2 and platform member 182, and motion is transmitted from one side of the hinge to the other.

Ideally, for a space-deployed environment (such as a satellite antenna), where gravitational forces are nearly zero, the force required to open the hinge should be minimal. However, for terrestrial applications, deployment loads may be significant. To provide the capability to maximize deployment force, a driven gear train 184 having a large (several thousand to one) gear ratio using simple spur gears in a clockwork-like mechanism is provided.

Figure 19A:
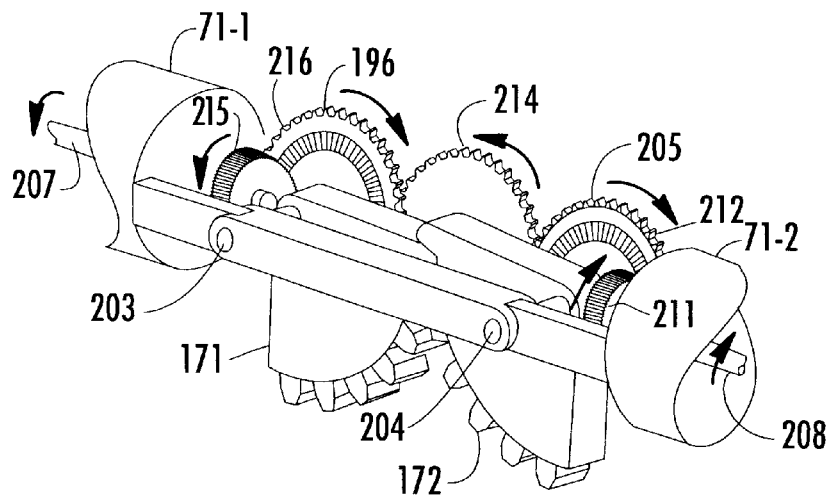

In order to synchronize the operation of each hinge with that of its neighbors, a pair of respective torsion tubes 207 and 208 are supported internal to the hoop members 71-1 and 71-2 to transmit rotary motion from one end of a hoop member to the other. As shown in FIG. 19A, the torsion tube 208 inside the hoop member 71-2 drives a set of bevel gears 211 and 212. A spur gear 205, rigidly attached to bevel gear 212, rotates a gear 214. This motion is transmitted via gear 196 to ultimately turn, through the bevel gear set 216, 215 the torsion tube 207. By this arrangement torque motion is transmitted through a respective hinge to power the next neighboring hinge. This rotation also provides the motive force driving the input to the gear train 184, as shown in FIG. 20.

FIG. 21 provides an enlarged view of FIG. 20, showing the input to the gear train 184, in which both the platform gear 183 and the torque transmission gear 196 have been removed for clarity. The input to the gear train 184 is from the troque tube 207 through bevel gear 194 to follower 216 aand its integral spur gear 195. Spur gear 195 is the first gear of the multi-pass gear train 184. The multi-pass gear train 184 consists of cascaded, back-to-back spur gears similar to a typical clockwork mechanism. The gears, secured in housing 192, are able to provide a relatively large gear reduction (e.g., several thousand to one) between the torque tube 207 and the platform drive gear 190. As a result, very little torsion of torque tube 207 is required to open the hinge. This mechanism provides a means to deliver deployment energy to the hinge, as well as transmit energy through the hinge to power its neighboring hinge. Since all driven hinges are tied together via internal hoop torsion tubes, the hinges are effectively geared and synchronized.

The hinge drive mechanism described above for a hoop mid hinge may be readily adapted for a corner hinge, as shown diagrammatically in FIGS. 22 and 23, which are respective front and rear views of a corner hinge joint for the fully deployed condition of the second embodiment of the invention. Except for the inherent bend at a corner joint, the architecture and operating mechanism of a respective corner joint hinge is identical to that for a mid-hinge. In the Figures, bold arrows 231 indicate the direction of motion to close (stow) the hoop segments 71-2 and 71-1 on opposite side of a corner hinge joint 75. The gearing is virtually the same as that described for the mid-hinge configuration shown in FIGS. 19–21, described above. The gear ratios among the hinges are identical in order to maintain synchronization, so that all of the hinges (both corner and mid-strut) will open the same angular amount in the course of going from a closed condition to an open or fully deployed condition. For a corner hinge joint used for the second embodiment of the invention (shown in FIG. 2, described above), a respective corner hinge 75 provides the force and kinematic linkage to open or deploy each of the struts (two adjacent upper struts 50L and 50R and one lower or bottom radial strut 60). FIGS. 22 and 23 show these three struts and their associated linkages.

The relationships among hoop members 71-2, 71-1 and truts 50L, 50R and 60, hinged at the corner joint 75 are illustrated in FIG. 23. The hoop members 71-2 and 71-1 are controlled directly by gearing described for the mid-hinge of FIGS. 19, 20 and 21. The bottom strut 60 contains a clevis 241 and is driven by a link 243 that is connected to a synchronization gear 245 via a clevis 247. For the upper strut 50L, a pivot axis support 251 is firmly attached to the hoop member 71-2. As the hoop member 71-2 moves with respect to the corner hinge platform 252, a platform clevis 254, a link 256 and a strut clevis 258 define the position of the upper strut 50L. The other upper strut 50R is driven by an identical, mirror image linkage.

The hinge and linkage mechanisms for deploying the hoop support structure in accordance with the first embodiment of the invention of FIG. 1 are diagrammatically illustrated in FIGS. 24 and 25. It should be noted that the structure illustrated in FIG. 24 is re-oriented with respect to that shown in FIG. 1, in order to more clearly show the details of the two hinges 23 and 25. Bold arrows 251 and 253 show the direction of motion to close the hoop members that connect to the driven hinge. As described above, and as shown in FIG. 24, the upper strut arrangement of the first embodiment differs from that of the second embodiment by the fact that distal ends of each of a pair of adjacent non-segmented upper radial strut elements 13, and distal ends of each of a pair of adjacent segmented upper rigid radial strut elements 14 are hinged together by means of passive (non-driven) hinges 260 installed at a plurality of outer perimeter corner joints 15.

In addition, each segmented upper radial strut 14 is formed of a pair of radial strut elements 14-1 and 14-2, that are interconnected by a folding passive mid-strut hinge joint 14-3 shown in FIG. 24. These mid-strut hinge joints 14-3 allow an adjacent non-segmented upper radial strut element 13 to be folded about the hoop corner hinge joints 23 and stowed generally parallel to the hoop members 21, as described above. FIG. 24 shows how the required kinematic deployment motion of the first embodiment is accomplished with three simple pivot joints.

Pivot joint 260 provides a hinge connection between the distal end of a non-segmented upper radial strut element 13 and the distal end of an adjacent segmented upper rigid radial strut elements 14. A simple pin pivot joint 261 pivotally connects interior ends of the upper radial strut elements 13 and 14 to the corner joints 25 of the hoop members 21. Pivot joint 14-3 provides a mid-strut hinge connection at the folding passive mid-strut joint between upper radial strut elements 14-1 and 14-2.

The configuration of each of the synchronously driven mid-hinges 25 of the first embodiment shown in FIGS. 24 and 25 is very similar to that of the corner hinge of the second embodiment shown in FIGS. 22 and 23. The segmented upper radial strut 14-2R is driven via linkage 254, 256 and 258, as shown in FIG. 25. A mirror or complementarily configured linkage is used to drive the other upper radial strut 14-2L. The hinge hoop members 21 and the bottom strut 18 are connected in the same manner as hoop members 71 and the bottom radial struts 60, and controlled as described with reference to the driven corner hinges of FIGS. 22 and 23.

Powering the deployment of the support structure may be readily achieved by a single electric motor driving a torsion tube anywhere along its length within a hoop member, such as at or near a hinge or within a hoop member, as shown at 234 in FIG. 22. A simple pinion attached to the motor output can drive a spur gear rigidly attached to the torsion tube. Advantageously, because of the torsion tube linkage and synchronized gearing within and between all the hinges, a single motor is able to deploy the entire structure. Alternatively, multiple motors may be installed for deployment redundancy.

Figure 26:
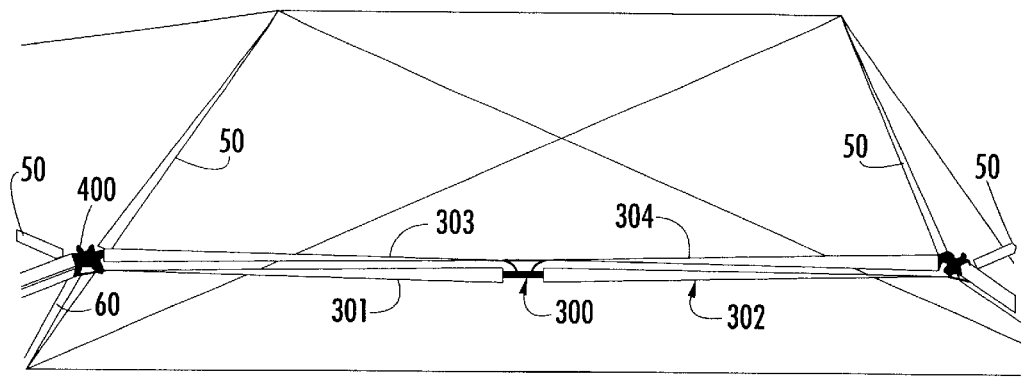
FIGS. 26, 27 and 28 illustrate an alternative synchronization scheme for the configuration of a hoop structure of the second embodiment of the invention.
Figure 27:
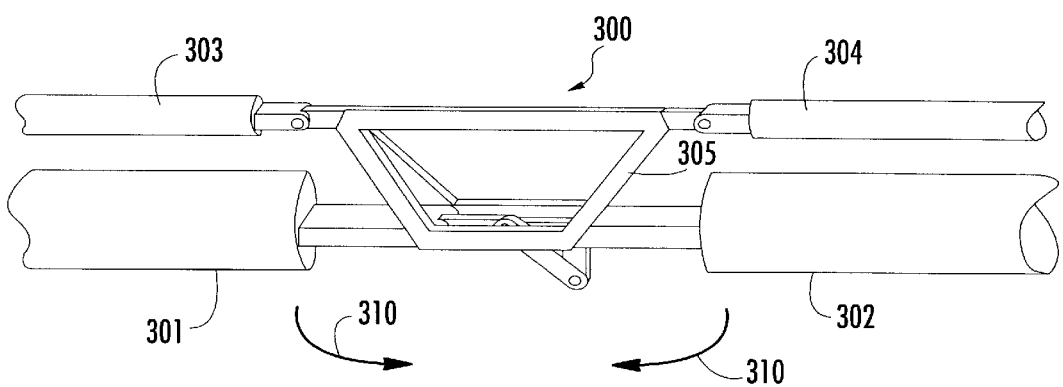
Figure 28:
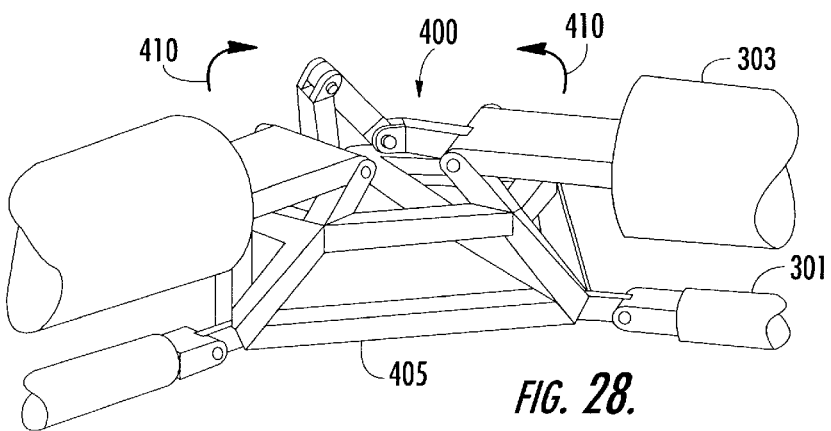

FIGS. 26, 27 and 28 illustrate an alternative configuration of the hoop structure of the second embodiment of the invention, having hinges installable at respective mid-hoop and corner regions. This alternative configuration comprises a set of four-bar linkages 300 and 400, having hoop members 301, 302, 303 and 304, and drive platforms 305 and 405. This embodiment of the invention is readily deployed by driving one of the hinges with a mechanism capable of generating sufficient force, such as the geared mechanisms described above. Since all the hinges are synchronized and linked via the four-bar linkages, all hinges will deploy simultaneously with the driven linkage. Bold arrows 310 and 410 indicate the direction for closing (stowing) the hoop members. The upper hoop members 303 and 304 maintain platforms 305 and 405 parallel to one another.

An advantage of the alternative embodiment of FIGS. 26–28 is a reduction in hardware complexity by removal of the gearing mechanisms. However, this requires doubling the number of elements within the hoop itself, which may not be a desirable trade-off from a cost or packaging aspect. Further, the internal member loads required to deploy the structure are substantially larger than for the geared design.

As will be appreciated from the foregoing description, the present invention provides a new and improved compactly stowable and space-deployable energy directing surface support architecture, that includes both radial and circumferential structural support members, for deploying an unfurlable surface, such as a conductive mesh-configured antenna reflector surface. The architecture of the present invention provides benefits in terms of weight and number of rigid elements. Many focusing structures, such as reflectors, require some amount of physical depth at their periphery. As a consequence, most hoop designs use two hoops—an upper hoop and a lower hoop—to supply this depth, which is maintained by installing additional vertical members to spatially separate the two hoops.

The generally hoop-configured support structure of the invention locates a single hoop at an interior position of the structure periphery, thereby reducing the overall length of the rigid members of which the hoop is formed. As described above the invention employs cord or other cable-like elements at the periphery of the radial struts as tension only elements. The total radial strut length is generally less than the overall lengths of the rigid members that are used to maintain structural periphery depth in a conventional double hoop designs. By incorporating these features, the total physical length of rigid members that collapse for storage and transport is reduced over prior art hoop configurations. This reduces overall structure complexity and enhances system reliability. Fewer rigid members also reduces the overall structural mass.

The architecture of the invention enjoys similar advantages over conventional designs using rigid radial elements. In general, the single hoop structure of the invention has a total rigid member length less than a radial design with eight or more rigid radial elements. When depth at the periphery of the deployed surface is considered, the present invention provides a considerably more efficient architecture than one obtained by adding more elements to a radial rib configuration. For example, to implement the 4.8 meter TDRS reflector structure referenced above, the present invention can be folded into a 0.3 meter diameter by 1.6 meter long cylindrical volume. Moreover, to implement a twelve meter reflector, a folded rib design using the structure of the invention is able to fit within a 0.6 meter diameter by 4 meter long cylindrical volume.

These characteristics of reduced numbers and lengths of rigid member apply equally to both non-folding and deployable forms of the structure. The rigid members (struts) of the support architecture of the invention are deployed to their open condition using a minimal number of and only two basic types of hinges. The driven hinges provide the essential power and synchronization to deploy the hoop and its struts in a slow and controlled manner. The nature of the deployment mechanism also provides a high motive force to load structural cords and tensioned surface elements, such as the electrically conductive (e.g., metallic) mesh often employed in reflector geometries. The high force developed by the driven hinge mechanism improves deployment reliability, by improving the capability to drive through any unforeseen snags or other anomalies that may occur in tensioned mesh reflectors.

By combining a geometry that reduces the total length of rigid elements, using tension-only elements where practical, and minimizing the number of hinges, the present invention provides a deployable support system that is less complex, lighter and folds to a more compact package than typical prior art configurations. Although the lightweight, compactly folding geometry of the invention is particularly suited for space deployed applications, it may also be used in systems, where fixed, non-deployable devices need to be extremely lightweight, including ground-based structures.

Using standard space qualified materials, the stability of the inventive structure will meet requirements for a precise reflector shape. The geometry and small mass of the architecture of the invention provide significant stiffness and minimal inertia to reduce dynamic distortions. Also, using low thermal coefficient of expansion materials ensures maintenance of the geometric precision when subjected to the extreme thermal environment of space. The antenna architecture of the present invention readily implements standard techniques to support a tensioned metal mesh, but is not limited to only these types of surfaces. The inventive structure, especially the non-folding configuration, can support any type of surface, whether solid or porous, tensioned or not.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A structural assembly comprising:
a rigid, single member hoop structure having a plurality of rigid appendages extending outwardly therefrom and forming struts in a triangular configuration;
a plurality of pivot elements distributed within said hoop structure, and at interfaces of said hoop structure and said rigid appendages, and being configured to collapse and deploy said hoop structure; and
tensioned, flexible, generally inextensible cable members connected to said hoop structure and said rigid appendages.

2. A structural assembly according to claim 1, wherein said hoop structure has a generally regular polygonal shape.

3. A structural assembly according to claim 1, wherein said hoop structure includes a plurality of rigid elements joined end-to-end to form a polygon, such that each end-to-end junction forms a corner of said polygon, and is generally equidistant from a centerline axis of said hoop structure perpendicular to a plane containing said rigid elements.

4. A structural assembly according to claim 3, wherein said appendages include rigid strut members, attached to said hoop structure and spanning a distance from said hoop structure to a periphery of said assembly, and wherein said rigid strut members are oriented outwardly from said centerline axis, and include upwardly extending struts, and downwardly extending struts, arranged to maintain a prescribed structural periphery depth and radial distance from said centerline axis.

5. A structural assembly according to claim 4, wherein said tensioned, flexible, generally inextensible elements include cords that are connected to said strut members, so as to maintain a prescribed length and force between distal ends of said strut elements and between said end-to-end junctions.

6. A structural assembly according to claim 5, wherein adjacent upwardly extending struts are joined at distal ends thereof.

7. A structural assembly according to claim 5, wherein said upwardly extending struts are spaced apart at distal ends thereof.

8. A structural assembly according to claim 3, wherein said pivot elements include pivot elements at corners of said hoop structure, configured to fold said rigid elements from a deployed polygonal shape to a stowed orientation that is generally parallel to said centerline axis.

9. A structural assembly according to claim 8, wherein said pivot elements at said corners are configured to fold said appendages to an orientation that is generally parallel to said centerline axis.

10. A structural assembly according to claim 9, further including pivot elements at midpoints of said rigid elements, that are configured to fold said rigid elements into an orientation that is generally parallel to said centerline axis.

11. A structural assembly according to claim 9, further including pivot elements at midpoints of selected appendages, and configured to fold said selected appendages into an orientation that is generally parallel to said centerline axis.

12. A structural assembly according to claim 6, further including a network of tensioned cords having pluralities of generally horizontal top and bottom components connected with generally vertical cords therebetween forming a planar truss, and being supported by said appendages.

13. A structural assembly according to claim 12, further including an energy directing surface supported by said network of tensioned cords.

14. A structural assembly according to claim 8, wherein a respective pivot element comprises a geared power transmission and hinge assembly that is configured to transmit power through a moving hinge to effect opening or closing thereof, and to maintain synchronous motion from one side of said hinge to another throughout all stages of motion of said hinge, and including torsion shafts within said rigid elements that transmit power among plural geared power transmission hinge assemblies.

15. A structural assembly according to claim 14, wherein a respective geared power transmission and hinge assembly includes a pair of gears rotatable about respective pivot axes, and coupled with a torsion shaft.

16. A structural assembly according to claim 15, wherein a respective geared power transmission and hinge assembly includes a rigid frame that supports and maintains a pair of hinges in a constant geometric relationship to each other through all stages of hinge motion.

17. A structural assembly according to claim 16, wherein a respective geared power transmission and hinge assembly further includes an idler gear situated between said gears of said pair to effect a rotation reversal in a deployment transmission path.

18. A structural assembly according to claim 1, wherein said rigid hoop structure comprises a multi-sided hoop structure, a respective side of which is configured as a four-bar linkage having upper and lower hoop members coupled at ends thereof to a platform linkage, a respective lower hoop member attaching to a lower part of said platform linkage, and a respective upper hoop member attaching to an upper part of said platform linkage, a respective platform linkage containing four pivots attached to two pairs of upper and lower hoop members.

19. A stowable and deployable support architecture to which an energy directing surface is attachable, comprising a multi-sided foldable single member hoop structure having a plurality of foldable joints, and generally radial struts that extend from and are foldable about corner joints of said multi-sided single member hoop structure with said struts being in triangular configuration, and at least one drive mechanism coupled to foldable joints of said multi-sided foldable, single member hoop structure, and being operative to unfold and deploy said multi-sided foldable, single member hoop structure and said plurality of generally radial struts and thereby said energy directing surface from a folded, stowed configuration to an unfolded, deployed configuration.

20. A stowable and deployable support architecture according to claim 19, wherein distal ends of respective pairs of adjacent radial struts that extend from corner joints of said multi-sided foldable hoop support structure are hinged together, and wherein mid-points of alternate segmented radial strut elements are hinged together by folding mid-strut hinge joints, so as to allow hinged together radial strut pairs to be folded about said corner hinge joints and stowed parallel to a respective hoop member of a side of said multi-sided foldable hoop structure, said radial struts being connected to said corner joints by multi-axis, synchronously driven hinges.

21. A stowable and deployable support architecture according to claim 20, further including an upper tensioning ring of tensioned upper cords that join together distal ends of upper radial struts, and a lower tensioning ring of tensioned lower cords that joint together distal ends of lower radial struts, and tension-only cord elements interconnecting distal ends of upper radial struts with distal ends of lower radial struts, so as to stabilize distal ends of said radial struts and impart stiffness to said support architecture in its deployed state.

22. A stowable and deployable support architecture according to claim 19, wherein a respective side of said multi-sided hoop structure is segmented into a pair of hoop members that are joined together by a driven hinge joint, upper and lower radial struts are coupled to corner joints of said multi-sided hoop structure by multi-axis driven hinge joints, and including a hinge drive mechanism that is configured synchronously drive each driven hinge joint.

23. A stowable and deployable support architecture according to claim 22, wherein distal ends of said radial struts are not hinged together, and further including an upper tensioning ring of tensioned upper cords that join together distal ends of upper radial struts, a lower tensioning ring of tensioned lower cords that joint together distal ends of lower radial struts, and tension-only cord elements interconnecting distal ends of upper radial struts with distal ends of lower radial struts, so as to stabilize distal ends of said radial struts and impart stiffness to said support architecture in its deployed state.

24. A method of manufacturing a stowable and deployable energy director comprising the steps of:

(a) providing a stowable and deployable support structure to which an energy-directing surface is attachable, said support structure having a multi-sided foldable single member hoop having a plurality of foldable joints, and generally radial struts that extend from and are foldable about corner joints of said multi-sided single member hoop with the struts being in triangular configuration, and at least one drive mechanism coupled to foldable joints of said multi-sided single member hoop, and being operative to unfold and deploy said multi-sided foldable single member hoop and said plurality of generally radial struts and thereby said energy-directing surface from a folded, stowed configuration to an unfolded, deployed configuration;

(b) providing a tensioning cord truss attachment framework for attaching an unfurlable energy-directing surface to said support structure provided in step (a);

(c) incorporating said energy-directing surface with said tensioning cord truss attachment framework provided in step (b) to form a composite energy-directing surface assembly; and (d) attaching said composite surface assembly formed in step (c) to said stowable and deployable support structure provided in step (a).

25. A method according to claim 24, wherein step (d) comprises attaching said composite surface assembly to selected ones of said generally radial struts of said stowable and deployable support structure.

26. A method according to claim 24, wherein step (b) comprises forming individual cord truss elements of an upper cord truss assembly as generally planar shaped structures, and wherein step (c) comprises assembling said generally planar shaped structures into a two-dimensional network containing a tensioned, mesh fabric of which said energy-directing surface is formed, and adjusting said two-dimensional network to which said tensioned, mesh fabric of which said energy-directing surface has been assembled, so as to conform with a prescribed geometry specification.

27. A method according to claim 26, wherein step (d) further comprises adjusting attachment points between said composite energy-directing surface assembly and said stowable and deployable support structure.

\* \* \* \* \*